United States Patent

[11] 3,584,196

[72] Inventors Eisuke Kurokawa;
 Hiromu Sasaki; Shigeru Hayakawa, all of Osaka-fu, Japan
[21] Appl. No 874,651
[22] Filed Nov. 6, 1969
[45] Patented June 8, 1971
[73] Assignee Matsushita Electric Industrial Co., Ltd. Osaka, Japan
[32] Priority Nov. 29, 1968
[33] Japan
[31] 43/105544

[54] AUTOMATIC ELECTRIC COOKING APPLIANCE
 2 Claims, 5 Drawing Figs.
[52] U.S. Cl.................................................... 219/435,
 99/329, 219/432, 219/441, 219/504, 219/510, 323/68
[51] Int. Cl..................................................... F27d 11/00
[50] Field of Search............................................ 219/432-
 —435, 439, 441, 442, 449, 450, 466, 385, 553,
 504—507; 99/281, 325, 329; 323/68; 431/74, 66;
 340/173

[56] References Cited
UNITED STATES PATENTS

| | | | |
|---|---|---|---|
| 2,388,909 | 11/1945 | Douglas...................... | 431/74 |
| 2,765,391 | 11/1956 | Shroyer....................... | 219/466 X |
| 3,025,455 | 3/1962 | Johsson........................ | 323/68 |
| 3,177,319 | 4/1965 | Komatsu...................... | 219/385 |
| 3,199,087 | 8/1965 | Foglia.......................... | 340/173 |
| 3,375,774 | 4/1968 | Fujimura et al............... | 219/441 X |
| 3,488,133 | 1/1970 | Perl............................. | 431/66 |
| 3,520,043 | 7/1970 | Darling......................... | 219/553X |
| 2,952,764 | 9/1960 | Minami........................ | 219/432 |

Primary Examiner—Volodymyr Y. Mayewsky
Attorney—Wenderoth, Lind and Ponack

ABSTRACT: An automatic electric cooking appliance comprises a cooking pot, a heating unit consisting of a metallic alloy heater connected in series with a resistor having a positive temperature coefficient of resistance (PTC resistor), and a bimetallic diaphragm for changing the thermal coupling between the PTC resistor and the cooking pot. The heating unit first heats the food for cooking, and then the bimetallic diaphragm abruptly lifts the cooking pot to reduce the thermal coupling and raise the temperature of the PTC resistor. This causes an abrupt increase in resistance and thereby a decrease in current flowing through the heating unit. Thus, only low wattage is used for warming the cooked food.

INVENTORS
EISUKE KUROKAWA
HIROMU SASAKI
SHIGERU HAYAKAWA

INVENTORS
EISUKE KUROKAWA
HIROMU SASAKI
SHIGERU HAYAKAWA

BY Wenderoth, Lind & Ponack
ATTORNEYS

AUTOMATIC ELECTRIC COOKING APPLIANCE

BACKGROUND OF THE INVENTION

1. FIELD OF THE INVENTION

This invention relates to an automatic electric cooking appliance, and more particularly to an electric cooking appliance, the heating unit of which comprises a metallic alloy heater and a resistor having a positive temperature coefficient of resistance (PTC resistor), and the thermal switching unit of which comprises a bimetallic diaphragm for changing the thermal coupling between the cooking pot and the PTC resistor.

2. DESCRIPTION OF THE PRIOR ART

There are known various automatic cooking appliances comprising a cooking pot, a heating unit consisting of a metallic alloy heater and a resistor having a positive temperature coefficient of resistance (PTC resistor). These conventional automatic cooking appliances have the following disadvantages. The current switching temperature of the PTC resistor shifts to the high temperature side when the line voltage is low and to the low side when the line voltage is high. Thus, line voltage fluctuation leads to an insufficient cooking when the line voltage is high and an excessive cooking when the line voltage is low.

The conventional cooking appliance described above requires a complicated circuit to avoid the shift of current switching temperature by line voltage variations. Such a fully automatic cooking appliance is very expensive.

SUMMARY OF THE INVENTION

An object of the invention is to provide an automatic electric cooking appliance, the current switching temperature of which does not shift due to variations of line voltage.

Another object of the invention is to provide such a fully automatic electric cooking appliance which has no complicated electrical circuit.

The objects of the invention are realized by an automatic electric cooking appliance comprising a cooking pot, a heating unit consisting essentially of a metallic alloy heater and of a resistor having a positive temperature coefficient of resistance (PTC resistor) connected in series to said metallic alloy heater, and a bimetallic diaphragm. The PTC resistor has an electrical resistance which is lower than that of the metallic alloy heater at room temperature but which rapidly increases above a given temperature. The bimetallic diaphragm is convex at room temperature, but above a given temperature it becomes concave, thereby lifting the cooking pot. The lifting weakens the thermal coupling between the cooking pot and the PTC resistor and raises the temperature of the PTC resistor. Consequently, the resistance of the PTC resistor increases to switch the current flowing through the heating unit. The switching temperature does not vary, regardless of variations of line voltage. After switching, a small wattage developed mainly from the PTC resistor is used to warm the already cooked food.

BRIEF DESCRIPTION OF THE DRAWINGS

The invention will be described in connection with the accompanying drawings, in which.

DESCRIPTION OF PREFERRED EMBODIMENTS

Before proceeding with a detailed description of the construction of the automatic cooking appliance according to the invention, the novel heating system including the heating unit and the bimetallic diaphragm will be explained with reference to FIGS. 1 to 4 of the drawings.

Figure 1:
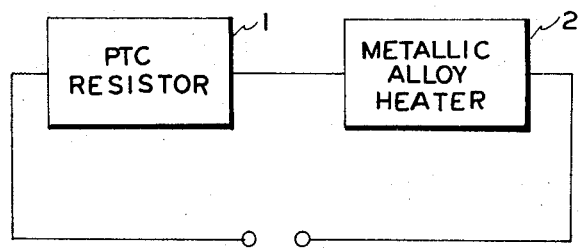
FIG. 1 is a circuit diagram of the heating unit of the present invention.

Referring to FIG. 1, terminals adapted to be electrically connected to a current source are connected to a PTC resistor 1 and to a metallic alloy heater 2. The PTC resistor 1 and the alloy heater are connected in series with each other. The PTC resistor is made of a so-called resistor having a positive temperature coefficient of resistance such as a semiconducting barium titanate ceramic which has a lower electrical resistance than that of the alloy heater at room temperature, but shows an abrupt increase in electrical resistance above a given temperature. Such resistors are disclosed in the prior literature (U.S. Pat. Nos. 3,044,968 and 2,981,699. The metallic alloy heater is made of conventional material such as a nickel-chromium alloy.

Figure 2:
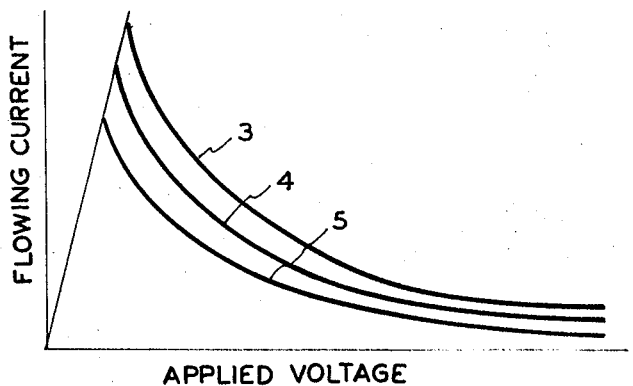
FIG. 2 is a graph showing characteristic current vs. voltage curves of the PTC resistor at several ambient temperatures.

Referring to FIG. 2, reference characters 3, 4 and 5 designate characteristic voltage-current curves for the PTC resistor with respect to various ambient temperatures. The ambient temperature increases in the order of the curves 3, 4 and 5.

A current flowing through the PTC resistor increases with an increase in the applied voltage, and there is an accompanying increase in the temperature of the PTC resistor itself. When the temperature exceeds a given temperature which depends on the chemical composition of the PTC resistor, the current flowing through the PTC resistor decreases, even with increasing applied voltage, because of the PTC characteristics. The characteristic voltage-current curves of the PTC resistor curve upwardly at low applied voltage, but then switches downwardly at higher applied voltages, as shown in FIG. 2. When the ambient temperature is high, this switching is achieved by a lower applied voltage. Therefore, the characteristic voltage-current curves of the PTC resistor shift down with an increase in the ambient temperature as shown in FIG. 2.

Figure 3:
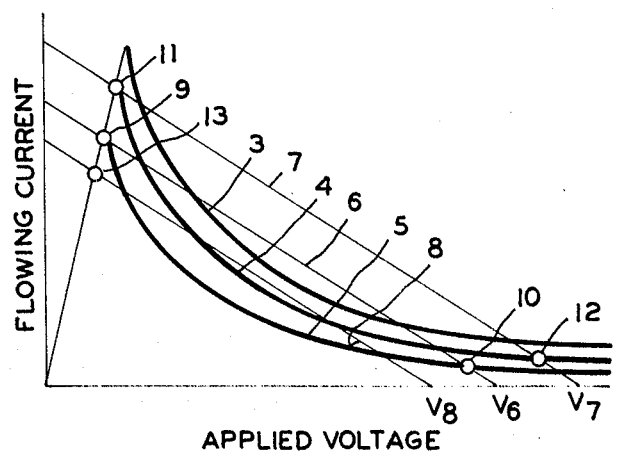
FIG. 3 is a graph showing various operating points of the heating unit and also shifts of the operating points, depending on variations of applied voltage.

FIG. 3 shows operating points of the present heating unit comprising the PTC resistor and the alloy heater when various voltages are applied. The voltage-current curves of the PTC resistor are designated by the same reference numbers as in FIG. 2. The load line of the alloy heater is represented by the reference characters 6 for the applied voltage $V_6$, 7 for $V_7$ and 8 for $V_8$, respectively. As a practical matter, the load line of the alloy heater varies slightly with the ambient temperature. However, the variation is negligible compared with that of the PTC resistor. An operating point is defined by the intersection of a voltage-current curve of the PTC resistor and with a load line of said alloy heater. The operating point can be determined by the current flowing in the heating unit and the voltages divided between the PTC resistor and the alloy heater. Since the voltage-current curves of the PTC resistor vary in the order 3, 4 and 5 with increasing ambient temperatures, the operating point shifts from point 9 for curves 3 and 4 to point 10 for the curve 5 when the applied voltage is $V_6$. The shift of the operating point from 9 to 10 causes a rapid current decrease called current switching.

When the applied voltage is high, as shown at $V_7$, the load line of the alloy heater is represented by the line 7 and the operating point can be represented by the point 11. At an ambient temperature slightly higher than the temperature corresponding to the curve 4, the operating point rapidly moves to the point 12. Thus, the current switching takes place at an ambient temperature lower than that of the applied voltage $V_6$. This leads to insufficient cooking.

When the applied voltage is lower than $V_6$, that is $V_8$, the load line of the alloy heater can be represented by the line 8. The operating point is represented by the point 13 for the ambient temperature corresponding to the curves 3, 4 and 5. Thus, the current switching tends to take place at an ambient temperature higher than that of the applied voltage $V_s$. This leads to excessive cooking.

Figure 4:
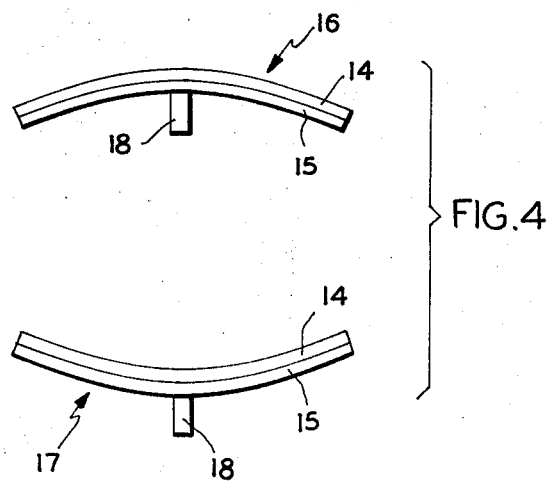
FIG. 4 is a cross-sectional view of a bimetallic diaphragm.

FIG. 4 shows a bimetallic diaphragm 16 made of, for example, the iron-nickel alloy element 14 and the iron-nickel-molybdenum alloy element 15. The reference number 16, as a whole, shows the bimetallic diaphragm as convex at room temperature and the number 17 as concave above a given temperature. The metallic alloy 14 has a larger thermal expansion coefficient than the metallic alloy 15. Thus, the bimetallic diaphragm is convex at low temperatures, and concave at high temperatures.

The bimetallic diaphragm has a metallic rod 18 welded at the center thereof.

Figure 5:
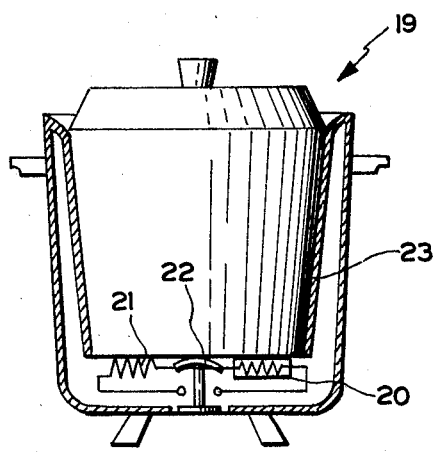
FIG. 5 is a cross-sectional view of the entire cooking appliance according to the invention.

Referring to FIG. 5, the cooking appliance 19 comprises a heating unit consisting of a PTC resistor 20 and an alloy heater 21, a bimetallic diaphragm 22 and an alloy heater 21, a bimetallic diaphragm 22 and a cooking pot 23 for the food to be cooked. Both the alloy heater 21 and the PTC resistor 20 are thermally coupled with the outer surface of the bottom of the cooking pot 23. The bimetallic diaphragm 22 and its supporting rod 18 are designed to cause thermal contact between the PTC resistor 20 and the cooking pot 23 below a given temperature. The temperature at which the "convex" to "concave" change of the diaphragm takes place may be as desired, for example 145° C. for cooking rice. Upon completion of the cooking, the temperature of the bimetallic diaphragm reaches the predetermined point at which the diaphragm changes from "convex" to "concave." By the change, thermal coupling between the cooking pot and the PTC resistor is weakened and the PTC resistor is further heated until it reaches its switching temperature. Thus, the current flowing through the heating unit is abruptly decreased. Since the change from "convex" to "concave" of the diaphragm takes place at a given temperature, the change is not affected by a variation of the line voltage. The present novel heating system consisting essentially of the heating unit and the bimetallic diaphragm has eliminated the disadvantageous switching temperature shift due to variation of line voltage.

The heating unit comprises a PTC resistor and metallic alloy heater connected in series. The PTC resistor has a lower resistance than that of the alloy heater at room temperatures of from 0° to 50° C. but possesses a higher resistance at the temperature where cooking is completed and where the cooked food need only be kept warm. The alloy heater and the PTC resistor are selected to provide a resistance ratio of the alloy heater resistance to the PTC resistor resistance of from 500:1 to 2:1 at room temperature, and of from 1:500 to 1:2 after switching. In this heating unit, the alloy heater is the main heat source for cooking and the PTC resistor is the main heat source for warming the cooked food.

Semiconductive barium and lead titanate solid solution ceramic PTC resistors may be prepared by a well known ceramic technique from the starting raw material powders such as $BaCO_3$, $PbO$, $TiO_2$, $SiO_2$, $Al_2O_3$ and one oxide selected from the group La, Gd, Sm, Bi, Nb, Ta, Sb and W. The shape of ceramic body is preferably disc-type. The ceramic disc is provided with electrodes on the opposite surfaces thereof.

The temperature for the change from "convex" to "concave" of the bimetallic diaphragm can be controlled by proper selection of the composition of the two alloys of the diaphragm. For example, in FIG. 4, the metallic alloy 14 consists of 64 percent by weight of iron and 36 percent by weight of nickel and the metallic alloy 15 consists of 72 percent by weight of iron, 21 percent by weight of nickel and 7 percent by weight of molybdenum. This diaphragm reacts at 145° C. and lifts the cooking pot about 0.7 mm. with a diaphragm radius of 40mm.

When rice is cooked with the present novel cooking appliance, a large current flows through the heating unit to boil the rice. As long as the water remains in the cooking pot, the temperature of the PTC resistor is from 100° to 110° C. The switching temperature of the PTC resistor is from 150° to 160° C. when using a composition of $Ba_{0.85-0.90}Pb_{0.10-0.15}TiO_3$ solid solution. When the boiling of the rice is completed and the water evaporates from the pot, the temperature of the cooking pot rapidly rises and reaches at about 145° C. At this moment, the bimetallic diaphragm reacts and lifts the pot upwardly. Since the PTC resistor thereby loses a heat sink, its temperature rapidly rises, and the PTC resistor switches the current flowing through the heating unit. A small wattage is dissipated mainly in the PTC resistor and is used for warming the boiled rice. When the temperature of the cooling pot is lowered to 145° C. by the current switching, the diaphragm reacts again causing a recontact between the PTC resistor and the cooking pot. Since the temperature of the PTC resistor is slightly lowered by the recontact, the current flowing through the heating unit slightly increases. The boiled rice is warmed by the slightly increased current.

Thus, the present heating system ensures reproducible cooking, regardless of the line voltage variations.

What we claim is:

1. An automatic electric cooking appliance comprising a cooking pot of metallic heat conductive material, an outer support for said pot, a heating unit thermally coupled to said pot and including a metallic alloy heater and a resistor positioned in the space between said support and said pot, said resistor having a positive temperature coefficient of resistance and connected in series with said metallic alloy heater, and a bimetallic diaphragm means positioned in said space for lifting said pot upon completion of cooking in response to a temperature change to change the thermocoupling between the PTC resistor and said cooking pot, thereby causing a current switching.

2. An automatic electric cooking appliance as claimed in claim 1, wherein said PTC resistor is a semiconductive barium and lead titanate solid solution ceramic.